(12) United States Patent
Basso et al.

(10) Patent No.: US 8,332,412 B2
(45) Date of Patent: Dec. 11, 2012

(54) METHOD AND APPARATUS FOR STAGED CONTENT ANALYSIS

(75) Inventors: Andrea Basso, Marlboro, NJ (US); Gustavo De Los Reyes, Fair Haven, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 374 days.

(21) Appl. No.: 12/603,356

(22) Filed: Oct. 21, 2009

(65) Prior Publication Data

US 2011/0093473 A1 Apr. 21, 2011

(51) Int. Cl.
*G06F 17/30* (2006.01)
(52) U.S. Cl. ........ 707/748; 707/750; 707/754; 707/913; 707/914; 707/915; 707/916
(58) Field of Classification Search .................. 707/754, 707/748, 750, 913, 914, 915, 916
See application file for complete search history.

(56) References Cited

U.S. PATENT DOCUMENTS

| | | | |
|---|---|---|---|
| 5,911,043 A | 6/1999 | Duffy et al. | |
| 6,122,657 A * | 9/2000 | Hoffman et al. | 709/201 |
| 6,181,364 B1 * | 1/2001 | Ford | 725/32 |
| 6,493,744 B1 | 12/2002 | Emens et al. | |
| 6,829,582 B1 * | 12/2004 | Barsness | 704/275 |
| 8,015,192 B2 * | 9/2011 | Rathod et al. | 707/748 |
| 8,032,539 B2 * | 10/2011 | Ebadollahi et al. | 707/754 |
| 2002/0147782 A1 * | 10/2002 | Dimitrova et al. | 709/207 |
| 2004/0064579 A1 * | 4/2004 | Jennings | 709/238 |
| 2005/0152666 A1 * | 7/2005 | Demeyer | 386/4 |
| 2007/0186235 A1 * | 8/2007 | Jarman et al. | 725/28 |
| 2008/0134282 A1 * | 6/2008 | Fridman et al. | 726/1 |
| 2008/0228928 A1 * | 9/2008 | Donelli et al. | 709/228 |
| 2009/0089829 A1 * | 4/2009 | Park et al. | 725/28 |
| 2009/0132520 A1 * | 5/2009 | Nemeth et al. | 707/5 |
| 2009/0234831 A1 * | 9/2009 | Ebadollahi et al. | 707/5 |
| 2009/0288112 A1 * | 11/2009 | Kandekar et al. | 725/32 |
| 2009/0328093 A1 * | 12/2009 | Cansler et al. | 725/28 |
| 2010/0125586 A1 * | 5/2010 | Van Vleck et al. | 707/748 |
| 2010/0257184 A1 * | 10/2010 | Uy | 707/748 |
| 2011/0067049 A1 * | 3/2011 | Piepenbrink et al. | 725/30 |
| 2011/0179043 A1 * | 7/2011 | Lidstrom et al. | 707/748 |

* cited by examiner

*Primary Examiner* — Thanh-Ha Dang
(74) *Attorney, Agent, or Firm* — Guntin Meles & Gust, PLC; Andrew Gust

(57) ABSTRACT

A system that incorporates teachings of the present disclosure may include, for example network device having a controller to receive multiple streams of content for portions of a multimedia work (MMW), perform a high level analysis for features in each of the streams for the MMW, perform a specialized analysis on the portion having a detected general feature to generate a content analysis output, correlate the content analysis output with other content analysis of the MMW, and output a weighted content description based on the correlation function. Other embodiments are disclosed.

19 Claims, 5 Drawing Sheets

500

METHOD AND APPARATUS FOR STAGED CONTENT ANALYSIS

FIELD OF THE DISCLOSURE

The present disclosure relates generally to method and apparatus for communication and more specifically to methods and apparatus for staged content analysis.

BACKGROUND

Analysis of content, particularly multimedia content is used to provide ratings or otherwise to allow users to filter or limit the viewing or listening of content by appropriate viewers typically classified by age or maturity. The process of analysis is tedious, inefficient and slow. Current methods of analysis use a frame by frame analysis on a single stream that fails to exploit redundancies in a number of different scenarios.

DETAILED DESCRIPTION

One embodiment of the present disclosure can entail a method of staged content analysis at an electronic device that receives multiple streams of content for portions of a multimedia work (MMW), performs a high level analysis for features in each of the streams for the MMW, segregates the analysis for the portion having a detected general feature for specialized analysis upon detection of a general feature, performs a specialized analysis on the portion having the detected general feature to generate a content analysis output, correlates the content analysis output with other content analysis of the MMW and outputs a weighted content description based on the correlation function. The electronic device can be a network element or a standalone device operating independent of a network.

Another embodiment of the present disclosure can entail a a network device having a controller to receive multiple streams of content for portions of a multimedia work (MMW), perform a high level analysis for features in each of the streams for the MMW, perform a specialized analysis on the portion having a detected general feature to generate a content analysis output, correlate the content analysis output with other content analysis of the MMW, and output a weighted content description based on the correlation function.

Yet another embodiment of the present disclosure can entail a computer-readable storage medium at a network device having computer instructions for receiving multiple streams of content for portions of a multimedia work (MMW), performing a coarse analysis for features in each of the streams for the MMW, upon detection of a general feature, segregating the analysis for the portion having a detected general feature for specialized analysis, performing a specialized analysis on the portion having the detected general feature to generate a content analysis output, and correlating the content analysis output with other content analysis of the MMW.

Figure 1:
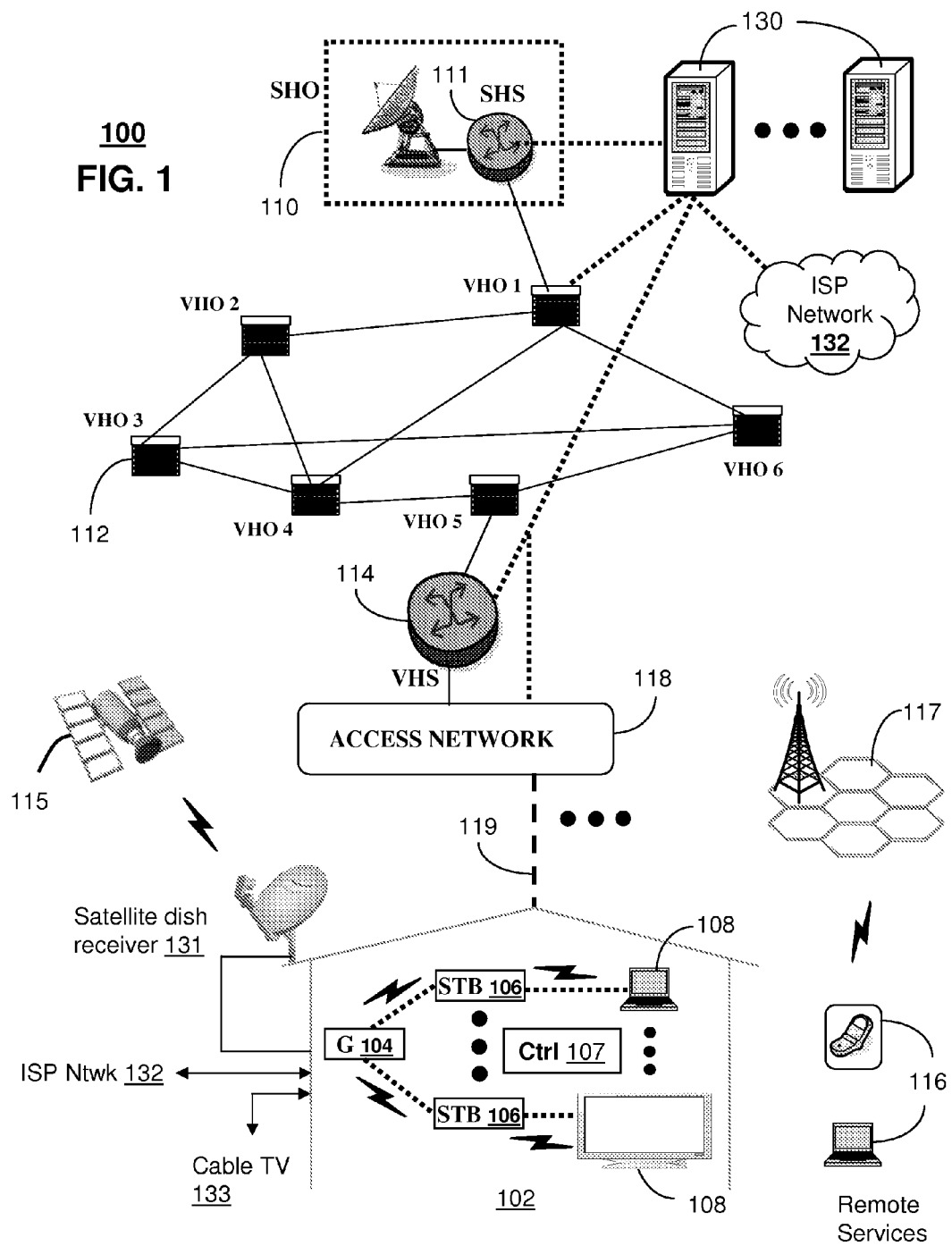
FIG. 1 depicts an illustrative embodiment of a communication system.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

Another distinct portion of the computing devices 130 can function as a content analysis server (herein referred to as analysis server 130). The analysis server 130 can use common computing and communication technology to perform the functions described herein.

Figure 5:
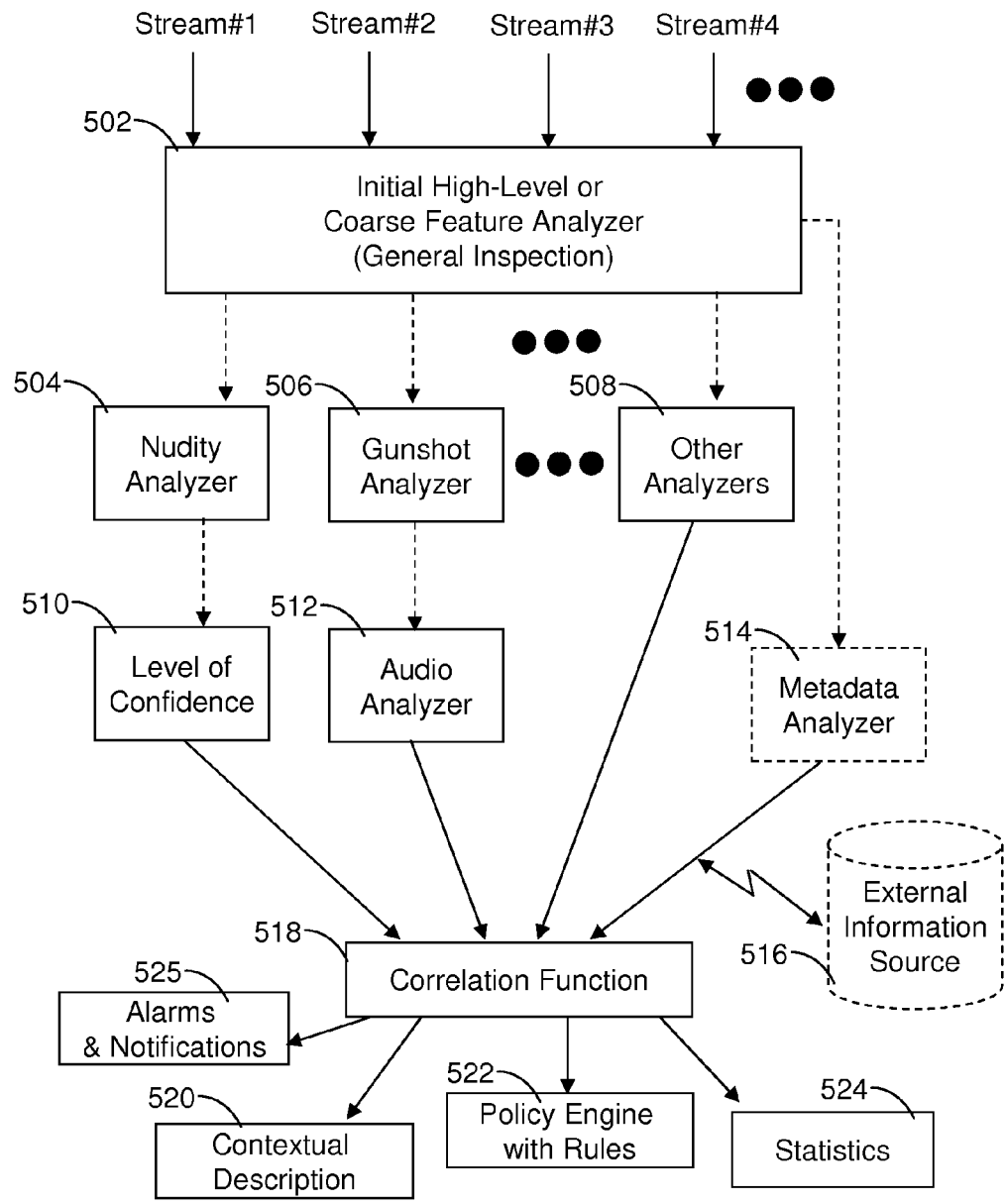
FIG. 5 depicts an illustrative embodiment of a communication system.

In a more specific example with reference to both FIGS. 1 and 5, an embodiment herein can serve as an iTV or IPTV content analyzer that can be performed at a network element such as the server 130, a STB 106 or even the wireless communication device 116. Such a system 500 as further illustrated in FIG. 5 can speed up the analysis of content by performing a staged content analysis on multiple streams of content for a multimedia work such as a movie. Rather than performing a frame by frame analysis, embodiments herein can receive as input multiple streams of a particular multimedia work and perform an initial high level or coarse feature analysis of the content input streams at the analyzer 502. The frames or sub-frames from the various inputs streams can already (but not necessarily) tagged with information such as content descriptors or timing information. The coarse analysis can perform a pre-filtering function where the analyzer determines candidates (among the frames or sub-frames) that contains particular features that are prevalent. The coarse or high level analysis can possibly do a general detection or determine a high probability of instance of particular characteristics or features. For example, it can do a coarse analysis for potential instances of blood, skin, violence, gunshots or other audio clues that can include instances of vulgarity. The pre-filtering functions enables the analyzer 502 to segregate the further analysis for more specialized or in-depth analysis using for example a nudity or obscenity analyzer 504, a gunshot analyzer 506, or any other number of specialized analyzers generally referenced as 508. The High Level Analyzer 502 can further detect redundant content where it is likely that further analysis of such content would not yield additional useful information. In other words, portions of a work might be considered redundant for purposes of content analysis and therefore it would be inefficient to perform further analysis on such portions.

The specialized analyzers (504-508) can likely perform in parallel. In some instances, a further analyzer such as analyzer 510 can provide a level of confidence of a particular feature or even provide confirmation of a particular feature on a frame by frame level if desired. Analogous functions can be performed on audio using an audio analyzer 512 or other analyzers. The outputs of the specialized analyzers are correlated at a correlation function 518. The correlation function 518 can further use analysis of metadata from a metadata analyzer 514 and/or external information source(s) (such as information from databases like The Internet Movie Database (IMDb) which is an online database of information related to movies, actors, television shows, production crew personnel, video games, and fictional characters featured in visual entertainment media). The correlation function 518 can provide multiple outputs including a contextual description output that can enable a user or viewer or listener to make a judgment as to the appropriateness of content for a particular audience. In a more automated sense, the correlation output can be used by a policy engine 522 that can contain rules to enable a presentation device to automatically filter or even deny access or provide limited access to a particular work. The policy engine can be user programmable and allow the user to define rules or policies as desired. The correlation function 518 can also provide an output to enable the tracking of statistics using a statistics function 524. For example, the statistics function 524 can provide an approximate number of instances of gunshots or a level of vulgarity that might be contained in a particular work. The output of the correlation function 518 can also include alarms and notifications 525. Such notifications can be real-time signals or non real time such as a daily report of incidents. Other statistics and information can be determined using the metadata analyzer and external information source.

It will be appreciated by an artisan of ordinary skill in the art that the staged analysis herein is not necessarily limited to multimedia works, but can be applied to just audio or just video as well. Of course, a combination of analyzers for a multimedia work can likely provide a better correlation since additional information sources and streams are used. Further note that the analysis can be performed in many optional locations within a network and is not necessarily limited to a particular server or a set top box. The analysis could even be performed at a personal computer or a mobile device.

In yet another embodiment, an analog or digital broadcast distribution system such as a satellite dish receiver 131 or cable TV system 133 can be used in place of the IPTV media system described above. In this embodiment the cable TV system 133 can provide Internet, telephony, and interactive media services. It follows from the above illustrations that the present embodiments can apply to any present or future interactive over-the-air or landline media content services.

Figure 2:
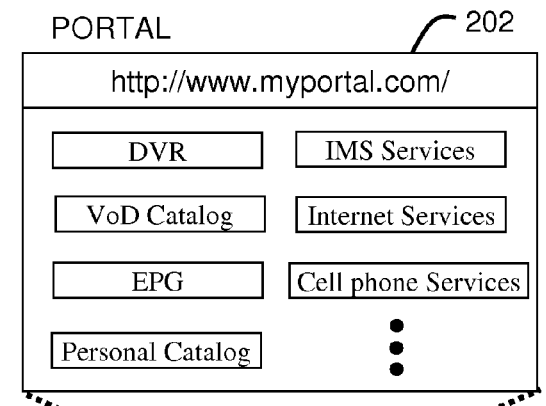
FIG. 2 depicts an illustrative embodiment of a portal interacting with the communication system of FIG. 1.
Figure 2:
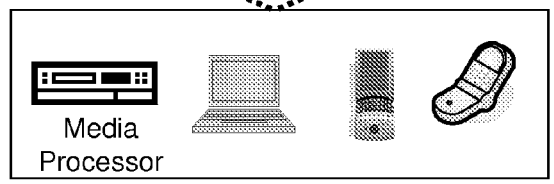

FIG. 2 depicts an illustrative embodiment of a portal 202 which can operate from the computing devices 130 described earlier of communication 100 illustrated in FIG. 1. The portal 202 can be used for managing services of communication systems 100-200. The portal 202 can be accessed by a Uniform Resource Locator (URL) with a common Internet browser such as Microsoft's Internet Explorer™ using an Internet-capable communication device such as those described for FIGS. 1-2. The portal 202 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 3:
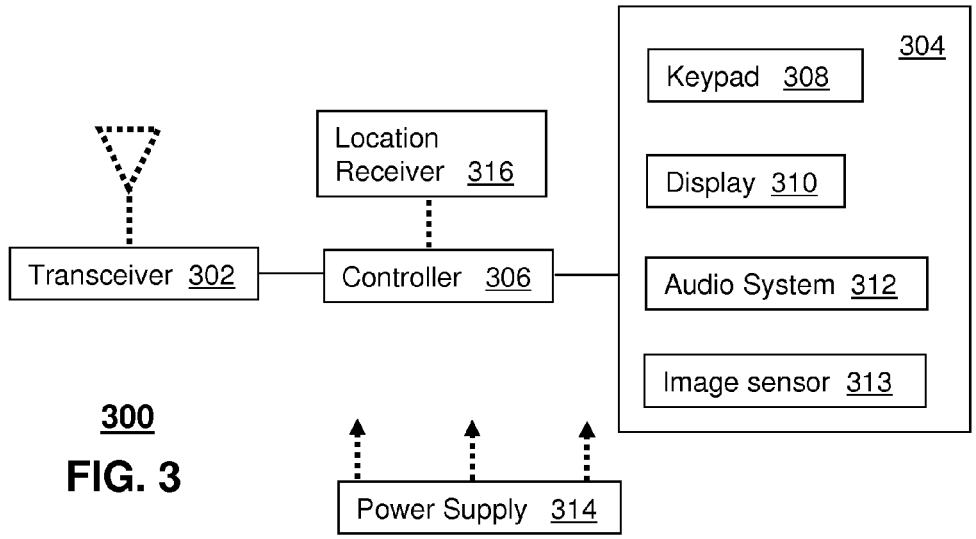
FIG. 3 depicts an illustrative embodiment of a communication device utilized in the communication system of FIG. 1.

FIG. 3 depicts an exemplary embodiment of a communication device 300. Communication 300 can serve in whole or in part as an illustrative embodiment of the communication devices of FIGS. 1-2. The communication device 300 can comprise a wireline and/or wireless transceiver 302 (herein transceiver 302), a user interface (UI) 304, a power supply 314, a location receiver 316, and a controller 306 for managing operations thereof. The transceiver 302 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 304 can include a depressible or touch-sensitive keypad 308 with a navigation mechanism such as a roller ball, joystick, mouse, or navigation disk for manipulating operations of the communication device 300. The keypad 308 can be an integral part of a housing assembly of the communication device 300 or an independent device operably coupled thereto by a tethered wireline interface (such as a USB cable) or a wireless interface supporting for example Bluetooth. The keypad 308 can represent a numeric dialing keypad commonly used by phones, and/or a Qwerty keypad with alphanumeric keys. The UI 304 can further include a display 310 such as monochrome or color LCD (Liquid Crystal Display), OLED (Organic Light Emitting Diode) or other suitable display technology for conveying images to an end user of the communication device 300. In an embodiment where the display 310 is touch-sensitive, a portion or all of the keypad 308 can be presented by way of the display.

The UI 304 can also include an audio system 312 that utilizes common audio technology for conveying low volume audio (such as audio heard only in the proximity of a human ear) and high volume audio (such as speakerphone for hands free operation). The audio system 312 can further include a microphone for receiving audible signals of an end user. The audio system 412 can also be used for voice recognition applications. The UI 304 can further include an image sensor 313 such as a charged coupled device (CCD) camera for capturing still or moving images.

The power supply 314 can utilize common power management technologies such as replaceable and rechargeable batteries, supply regulation technologies, and charging system technologies for supplying energy to the components of the communication device 300 to facilitate long-range or short-range portable applications. The location receiver 316 can utilize common location technology such as a global positioning system (GPS) receiver for identifying a location of the communication device 100 based on signals generated by a constellation of GPS satellites, thereby facilitating common location services such as navigation.

The communication device 100 can use the transceiver 302 to also determine a proximity to a cellular, WiFi or Bluetooth access point by common power sensing techniques such as utilizing a received signal strength indicator (RSSI) and/or a signal time of arrival (TOA) or time of flight (TOF). The controller 306 can utilize computing technologies such as a microprocessor, a digital signal processor (DSP), and/or a video processor with associated storage memory such a Flash, ROM, RAM, SRAM, DRAM or other storage technologies.

The communication device 300 can be adapted to perform the functions of the media processor 106, the media devices 108, or the portable communication devices 56 of FIG. 1. It will be appreciated that the communication device 300 can also represent other common devices that can operate in communication systems 100 of FIG. 1 such as a gaming console and a media player.

Figure 4:
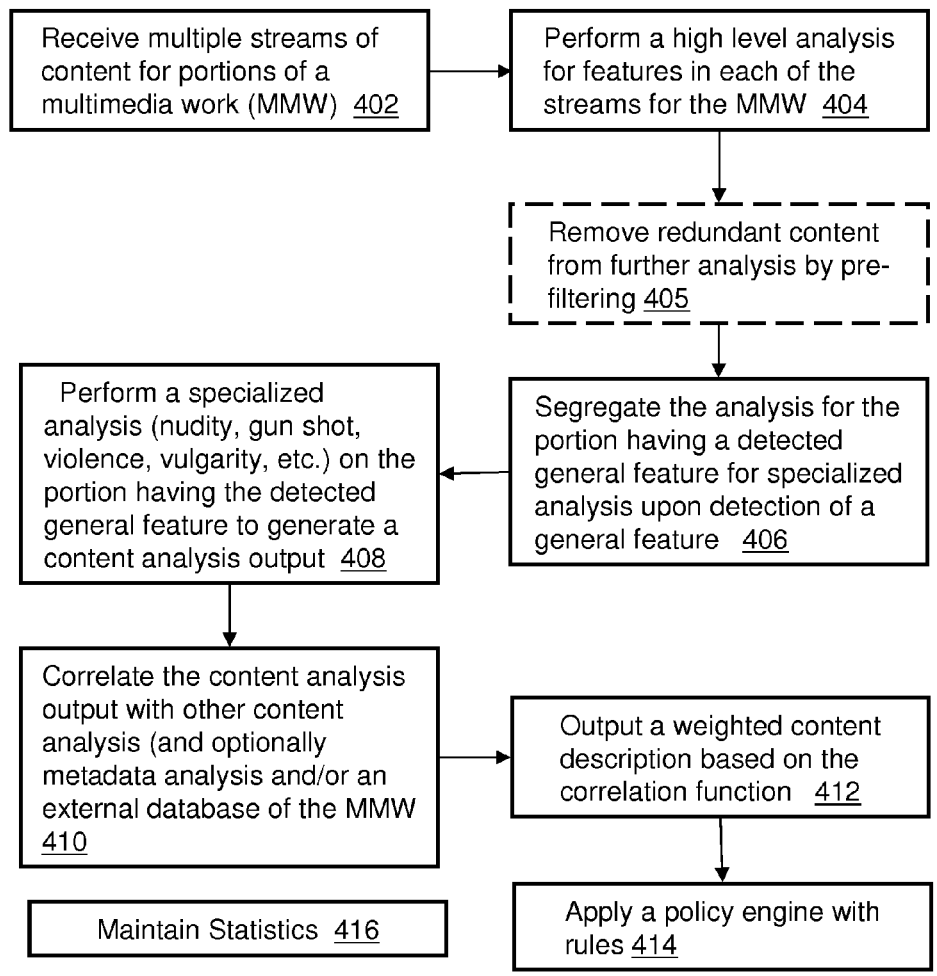
FIG. 4 depicts an illustrative embodiment of a method operating in portions of the communication system of FIG. 1.

FIG. 4 depicts an illustrative method 400 that operates in portions of the communication system of FIG. 1 or 5. Method 400 can begin with step 402 in which a network element can receive multiple streams of content for portions of a multimedia work (MMW), perform a high level analysis for features in each of the streams for the MMW at 404, segregate the analysis for the portion having a detected general feature for specialized analysis upon detection of a general feature at 406, perform a specialized analysis on the portion having the detected general feature to generate a content analysis output at 408, correlate the content analysis output with other content analysis of the MMW at 410, and output a weighted content description based on the correlation function. The method 400 can optionally pre-filter certain redundant content and remove such content from further analysis at 405. The method can also apply at 414 a policy engine with rules and maintain statistics at 416. The method uses temporal redundancies in scenes to increase confidence and the speed of the analysis.

Upon reviewing the aforementioned embodiments, it would be evident to an artisan with ordinary skill in the art that said embodiments can be modified, reduced, or enhanced without departing from the scope and spirit of the claims described below. The networks used are not necessarily limited to IPTV or iTV and the wireless communication networks should not be limited to cellular or Wifi or WiMAX. The location determining technologies are not limited to GPS and can include any number of location technologies for determining the location of a target party.

Other suitable modifications can be applied to the present disclosure without departing from the scope of the claims below. Accordingly, the reader is directed to the claims section for a fuller understanding of the breadth and scope of the present disclosure.

Figure 6:
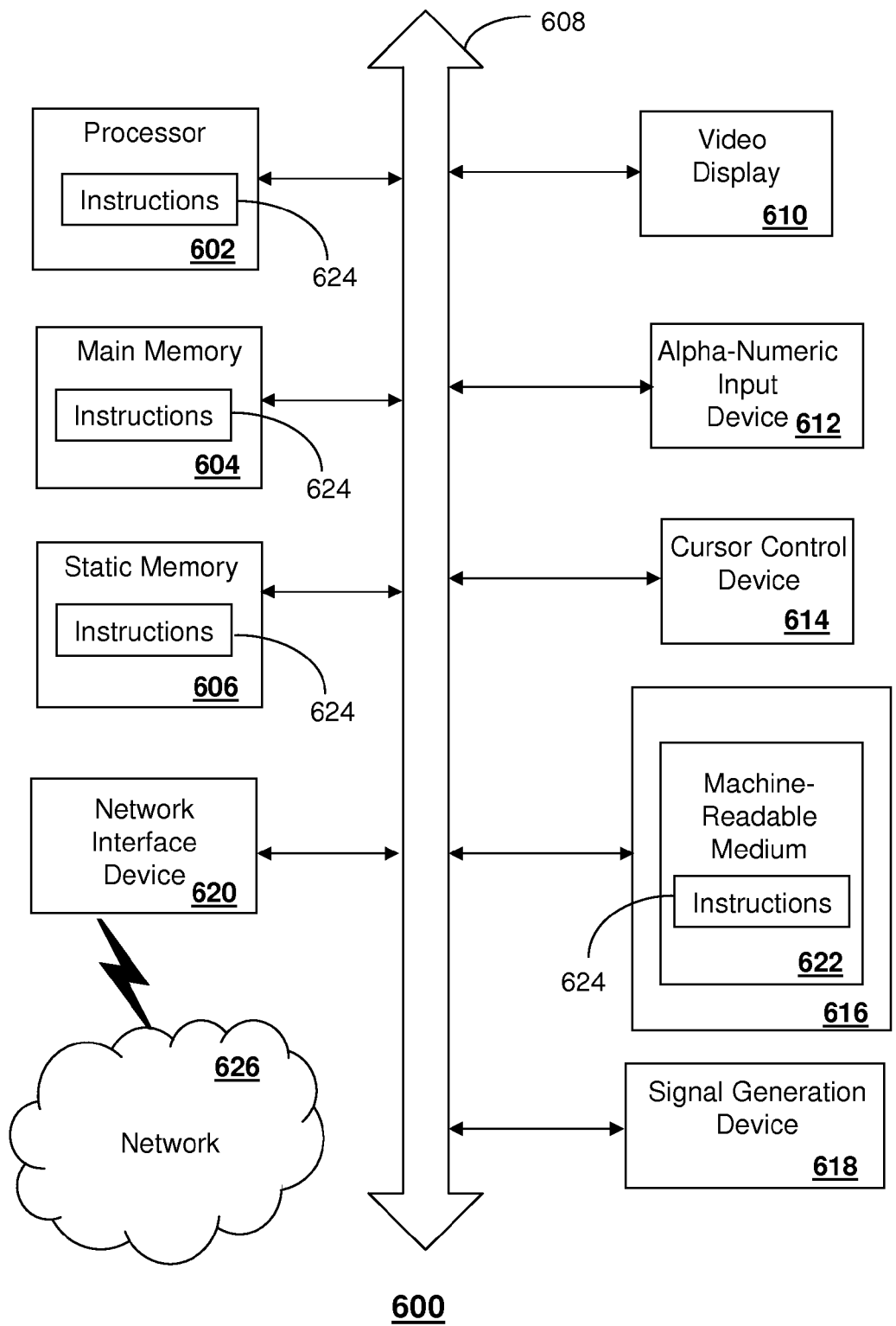
FIG. 6 is a diagrammatic representation of a machine in the form of a computer system within which a set of instructions, when executed, may cause the machine to perform any one or more of the methodologies discussed herein.

FIG. 6 depicts an exemplary diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
receiving, by a system including a processor, a content stream of a multimedia work;
performing, by the system, a coarse feature analysis of the content stream at a multiple frame level;
identifying, by the system, one or more portions of the content stream having one or more potential occurrences of one or more objectionable features of a plurality of objectionable features according to the coarse feature analysis of the content stream;
responsive to identifying the one or more portions of the content stream, performing, by the system, one or more feature specific analyses on the one or more portions of the content stream at a frame by frame level;
identifying, by the system, one or more actual occurrences of the one or more objectionable features according to the one or more feature specific analyses of the one or more portions of the content stream; and
correlating, by the system, the identified one or more actual occurrences of the one or more objectionable features with additional information associated with the multimedia work to generate a weighted content description of the multimedia work.

2. The method of claim 1, comprising applying a policy engine with rules to generate the weighted content description of the multimedia work.

3. The method of claim 1, comprising generating statistics associated with the weighted content description of the multimedia work.

4. The method of claim 1, comprising obtaining the additional information from a metadata source associated with the multimedia work.

5. The method of claim 1, comprising correlating the identified one or more actual occurrences of the one or more objectionable features with additional information associated with the multimedia work and an external database to generate a second weighted content description of the multimedia work.

6. The method of claim 1, wherein the feature specific analyses comprise at least one among an obscenity analysis, an audio violence analysis, a gunshot analysis or a combination thereof.

7. The method of claim 1, comprising filtering out redundant content in the content stream prior to performing the coarse feature analysis.

8. The method of claim 1, wherein the one or more feature specific analyses comprise determining temporal content redundancies in the one or more portions of the content stream.

9. The method of claim 1, comprising receiving the content stream of the multimedia work from an Internet Protocol television network.

10. A network device, comprising a memory coupled to a controller, wherein the memory comprises computer instructions, which when executed by the controller, cause the controller to perform operations comprising:
 receiving a content stream of a multimedia work;
 identifying one or more portions of the content stream having one or more potential occurrences of one or more objectionable features from a plurality of objectionable features according to a coarse feature analysis of the content stream at a multiple frame level;
 responsive to identifying the one or more portions of the content stream, identifying one or more actual occurrences of the one or more objectionable features according to one or more feature specific analyses of the one or more portions at a frame by frame level; and
 correlating the identified one or more actual occurrences of the one or more objectionable features with additional information associated with the multimedia work to generate a weighted content description of the multimedia work.

11. The network device of claim 10, wherein the one or more feature specific analyses comprise an obscenity analyzer, an audio violence analyzer, or a gunshot analyzer.

12. The network device of claim 10, wherein the computer instructions cause the controller to apply a policy engine with rules to the weighted content description of the multimedia work.

13. The network device of claim 10, wherein the network device is a set top box in an interactive television network.

14. The network device of claim 10, wherein the computer instructions cause the controller to obtain the additional information from at least one of a metadata source associated with the multimedia work or an external database.

15. The network device of claim 10, wherein the computer instructions cause the controller to filter out redundant content in the content stream.

16. A non-transitory computer-readable storage medium, comprising computer instructions, which when executed by a processor of a network device cause the processor to perform operations comprising:
 identifying one or more portions of a received content stream having one or more potential occurrences of one or more objectionable features from a plurality of objectionable features according to a coarse feature analysis of the received content stream at a multiple frame level;
 responsive to identifying that one or more portions of the received content stream, identifying one or more actual occurrences of the one or more objectionable features according to one or more feature specific analyses of the one or more portions at a frame by frame level; and
 correlating the identified one or more actual occurrences of the one or more objectionable features with additional information associated with the multimedia work to generate a weighted content description of the multimedia work.

17. The non-transitory computer-readable storage medium of claim 16, wherein the network device comprises computer instructions to cause the processor to output the weighted content description of the multimedia work.

18. The non-transitory computer-readable storage medium of claim 16, wherein the one or more feature specific analyses comprise an obscenity analyzer, an audio violence analyzer, or a gunshot analyzer.

19. The non-transitory computer-readable storage medium of claim 16, wherein the network device comprises computer instructions to cause the processor to filter out redundant content.

* * * * *